US008236910B2

(12) United States Patent
Ruchatz et al.

(10) Patent No.: US 8,236,910 B2
(45) Date of Patent: Aug. 7, 2012

(54) CYCLOOLEFIN COPOLYMERS, A PROCESS FOR THEIR PREPARATION AND THE USE THEREOF AND CATALYSTS

(75) Inventors: Dieter Ruchatz, Heiligenhaus (DE); Anne-Meike Schauwienold, Hofheim (DE); Peter Jörg, Neu-Isenburg (DE)

(73) Assignee: Topas Advanced Polymers GmbH, Frankfurt (DE)

( * ) Notice: Subject to any disclaimer, the term of this patent is extended or adjusted under 35 U.S.C. 154(b) by 540 days.

(21) Appl. No.: 12/077,433

(22) Filed: Mar. 19, 2008

(65) Prior Publication Data
US 2008/0242812 A1 Oct. 2, 2008

(30) Foreign Application Priority Data
Apr. 2, 2007 (DE) .......................... 10 2007 015 707

(51) Int. Cl.
C08F 4/76 (2006.01)

(52) U.S. Cl. ........ 526/183; 502/152; 526/154; 526/155; 526/170; 526/185; 526/190; 526/192; 526/195; 526/196; 526/198; 526/217; 526/226; 526/280; 526/281; 526/308; 526/348; 526/348.8; 528/9; 528/395; 528/396; 556/51; 556/52; 556/53

(58) Field of Classification Search ........ 526/280, 526/281, 192, 196, 226, 348, 348.8, 154, 526/155, 170, 183, 185, 190, 195, 198, 217, 526/308; 502/152; 528/9, 395, 396; 556/51, 556/52, 53
See application file for complete search history.

(56) References Cited

U.S. PATENT DOCUMENTS

| | | | | |
|---|---|---|---|---|
| 5,346,925 A * | 9/1994 | Sugano et al. | ................... | 521/54 |
| 5,602,219 A * | 2/1997 | Aulbach et al. | ............... | 526/160 |
| 6,239,187 B1 | 5/2001 | Hatke et al. | .................... | 521/150 |
| 6,316,560 B1 * | 11/2001 | Jacobs et al. | ................... | 526/160 |
| 6,410,661 B1 * | 6/2002 | Kaminsky et al. | ............ | 526/127 |
| 7,026,494 B1 * | 4/2006 | Yang et al. | ........................ | 556/11 |
| 2002/0115805 A1 * | 8/2002 | Waymouth et al. | ........... | 526/160 |
| 2004/0067382 A1 * | 4/2004 | Niepelt | .......................... | 428/515 |

FOREIGN PATENT DOCUMENTS

| | | |
|---|---|---|
| DE | 195 40 356 A1 | 7/1997 |
| DE | 196 52 340 A1 | 6/1998 |
| EP | 0 610 851 A1 | 8/1994 |
| EP | 0 610 852 A1 | 8/1994 |
| EP | 0 678 530 | 10/1999 |
| JP | 05043619 A | 2/1993 |

(Continued)

OTHER PUBLICATIONS

Ciba Inc., Nov. 2008, Irganox 1010 product data sheet.*

(Continued)

*Primary Examiner* — Vasu Jagannathan
*Assistant Examiner* — Richard A Huhn
(74) *Attorney, Agent, or Firm* — Michael W. Ferrell, Esq.

(57) ABSTRACT

Cycloolefin copolymers which are distinguished by the presence of racemic diads of repeating polycyclic units and additionally by racemic triads of repeating polycyclic units are described. These copolymers can be prepared by copolymerization of polycyclic olefins with linear olefins in the presence of metallocene catalysts which have no $C_s$ symmetry in relation to the centroid-M-centroid plane. The novel copolymers can be used for the production of shaped articles, in particular of films.

16 Claims, 5 Drawing Sheets

FOREIGN PATENT DOCUMENTS

| | | |
|---|---|---|
| JP | 05202124 A | 8/1993 |
| WO | 2006/573091 | 6/2006 |

OTHER PUBLICATIONS

"13C NMR-Studies of Ethene/Norbornene Copolymers Using 13C-Enriched Monomers: Signal Assignments of Copolymers Containing Norbornene Microblocks of Up to a Length of Three Norbornene Units", Wendt et al., Macromol. Chem. Phys. 2001, 202, 3490-3501.

"Asymmetric Zirconocene Precursors for Catalysts of Propylene Polymerisation", Fierro et al., J. Polym. Sci., Part A: Polym. Chem. (1994), 32(15), 2817-24; "Syndiospecific Propylene Polymerization with C1 Symmetric Group 4 ansa-Metallocene Catalysts", Leino et al., Macromolecules (2001), 34(7), 2072-2082.

"Synthesis, structure, and catalytic properties of ansa-zirconocenes, Me2X(Cp)(RInd)ZrCl2 (X=C, Si, R=2-p or 3-p-tolyl)", Yoon et al., J. Organomet. Chem. (1997), 534(1-2), 81-87; and "Synchospecific Propylene Polymerization Using C1-Symmetric ansa-Metallocene Catalysts: Substituent and Bridge Effects", Gomez et al., Macromolecules (2002), 35(9), 3358-3368.

Sung Cheol Yoon et al., Synthesis. Structure, and Catalytic Properties of Ansa-Zirconocenes, Me2X(Cp)(Rind)ZrCl2 (X=C, Si; R=2-p- or 3-p-tolyl), Journal of Organometallic Chemistry 534 (1997), pp. 81-87; Kari Mönkkönen et al., Synthesis and Characterization of Poly(ethylen co-norbornadiene), Macromol. Chem. Phys. 200 (1999), pp. 2623-2628; and.

Malcolm L.H. Green et al., New Ansa-Metallocenes of the Group 4 Transition Metals as Homogeneous Catalysts for the Polymerization of Propene and Styrene, J. Chem. Soc. Dalton Trans., 194, pp. 657-665.

Hasan et al., Ethene-Norbornene Copolymer With High Norbornene Content Produced by ansa-Fluorenylamidodimethyltitanium Complex Using a Suitable Activator, Macromolecules 2004, pp. 8503-8509; Lasarov H. et al., Influence of Batch Reaction Conditions on Norbornene/Ethylene Copolymers Made Using C2V-Symmetric Metallocene/Mao Catalysts, Sep. 1, 1998, Macromolecular Chemistry and Physics, Wiley-VCH Verlag, Weinheim, DE, pp. 1939-1942.

European Examination Report.

* cited by examiner

CYCLOOLEFIN COPOLYMERS, A PROCESS FOR THEIR PREPARATION AND THE USE THEREOF AND CATALYSTS

CLAIM FOR PRIORITY

This application is based upon German Patent Application No. DE 10 2007 015 707.1, entitled "Cycloolefin-Copolymere, Verfahren zu ihrer Herstellung, deren Verwendung und Katalysatoren", filed Apr. 2, 2007. The priority of German Patent Application No DE 10 2007 015 707.1 is hereby claimed and its disclosure incorporated herein by reference.

TECHNICAL FIELD

The present invention relates to racemically linked cycloolefin copolymers having a particular microstructure, a process for the preparation of these copolymers, selected catalysts which can be used in this process and the use of the cycloolefins copolymers.

BACKGROUND

The macroscopic properties of cycloolefin copolymers depend on the microstructure of the polymer chain. The microstructure of the polymer chain is influenced by the type of catalyst used.

In R. A. Wendt, G. Fink, Macromol. Chem. Phys. 2001, 202, 3490, the microstructure of ethene/norbornene copolymers which were prepared with the aid of various catalyst systems is investigated. Since norbornene generally shows only a slight tendency to block formation, alternating copolymers are formed with the use of most known catalysts with an excess of norbornene. However, examples are also described for racemically and mesomerically linked norbornene diads. For example, copolymers having racemically linked norbornene diads can be produced with the aid of the catalyst system Me$_2$C(Cp)(Flu)ZrCl$_2$ (Me=methyl, Cp=cyclopentadienyl, Flu=fluorenyl). Furthermore, ethene/norbornene copolymers having mesomerically linked diads, which also show signals from 34.5 to 40.5 ppm in the $^{13}$C-NMR spectrum, are produced with the aid of Me$_2$Si[Ind]$_2$ZrCl$_2$ catalysts (Ind=indenyl). These signals are presumably to be assigned to norbornene triads. However, the authors did not succeed in preparing copolymers which contain racemically linked diads and also show signals from 34.5 to 40.5 ppm in the $^{13}$C-NMR spectrum.

It is therefore an object of the present invention to provide cycloolefin copolymers having a novel microstructure which have racemically linked diads of the polycyclic units and triads of the polycyclic units, and which additionally contain signals from 34.5 to 40.5 ppm for the norbornene-ethylene system in the $^{13}$C-NMR spectrum, processes for their preparation and selected catalysts which can be used in these processes.

This object is achieved by the features of the independent claims 1 and 13.

Special embodiments of the invention are defined by the subclaims.

Surprisingly, it has been found that special metallocene catalysts which show no $C_s$ symmetry relative to the centroid-metal-centroid plane are suitable for the copolymerization of cycloolefins with 1-olefins, with the aid of which copolymers having a special microstructure can be provided.

This microstructure is characterized by the presence of racemic diads of repeating polycyclic units and additionally by further repeating polycyclic units. Racemically linked norbornene diads in ethylene-norbornene copolymers have characteristic signals in the $^{13}$C-NMR spectrum. These signals show a chemical shift of 29.44 ppm and 31.24 ppm, the solvent used being C$_2$D$_2$Cl$_4$ and the average solvent signal having a chemical shift of 74.00 ppm. In the case of the additional repeating polycyclic units, it is assumed that they are racemic cycloolefin triads which, in the case of ethylene-norbornene copolymers, produce additional signals from 34.5 to 40.5 ppm in the $^{13}$C-NMR spectrum. Diads are defined as two polycyclic olefin units directly linked to one another, and triads are defined as three polycyclic olefin units directly linked to one another.

In the context of the present invention, centroid is to be understood as meaning the center of the cyclopentadienyl ring linked to the metal by complex formation. This may be a cyclopentadienyl ligand or a substituted cyclopentadienyl ligand or a ligand which has a higher degree of condensation and a cyclopentadienyl ring and which optionally may be substituted.

A plane which represents a plane of symmetry is defined by the centers of the metal atom and of the two centroids. Catalysts used in the process according to the invention have no $C_s$ symmetry in relation to this plane.

Some of these metallocene catalysts have already been used for the polymerization of 1-olefins.

In the article "Asymmetric Zirconocene Precursors for Catalysts of Propylene Polymerisation", Fierro, Ricardo et al., J. Polym. Sci., Part A: Polym. Chem. (1994), 32(15), 2817-24, propylene polymerization with the use of racemic isopropylidene (1-η$^5$-cyclopentadienyl)-(η$^5$-indenyl)-dichlorozirconium and the 3-methylindenyl derivative thereof are described. Both derivatives lead to similar products in the propylene polymerization.

JP-A-05/043619 describes the polymerization of ethene in the presence of isopropylidene(cyclopentadienyl)(indenyl) zirconium dichloride and methylaluminoxane in toluene. In the polymerization, branched polyethylene forms without addition of a comonomer.

In the article "Syndiospecific Propylene Polymerization with C1 Symmetric Group 4 ansa-Metallocene Catalysts", Leino, Reko, et al., Macromolecules (2001), 34(7), 2072-2082, bridged and substituted cyclopentadienyl-3-R-indenyl-metallocenes are described. The polymerization of propene with the aid of these catalysts leads to syndiotactic polypropylene.

JP-A-52/02124 describes the polymerization of 1-olefins in the presence of metallocene catalysts and aluminoxanes. The metallocene catalysts have a bridged cyclopentadienyl sandwich structure, one of the cyclopentadienyl rings being substituted.

"Synthesis, structure, and catalytic properties of ansa-zirconocenes, Me$_2$X(Cp)(RInd)ZrCl$_2$ (X=C, Si, R=2-p or 3-p-tolyl)", Yoon, Sung Cheol et al., J. Organomet. Chem. (1997), 534(1-2), 81-87, describes novel metallocene complexes which were developed with the aim of providing catalysts for the preparation of syndiotactic polypropene. However, the synthesized complexes show only slight syndiospecificity.

The article "Syndiospecific Propylene Polymerization Using C$_1$-Symmetric ansa-Metallocene Catalysts: Substituent and Bridge Effects", Gomez, Fernando J., et al., Macromolecules (2002), 35(9), 3358-3368, describes the synthesis of a number of C$_1$-symmetric ansa-metallocenes ([Me2X(Cp)(2-R1-3-R2-Ind)]ZrCl2, X=C, Si; R1=H, Me; R2=Me, Et, CH2SiMe3), and their catalytic behavior in the polymerization of propene. Depending on substituent size, substituent pattern and bridging unit, polypropylene having different high degrees of syndiotacticity ([rrrr]=28-66%) was obtained.

SUMMARY OF INVENTION

According to the invention, a process for the copolymerization of 1-olefins with cycloolefins is now provided. This process comprises the polymerization of at least one cycloolefin of the following formula (I)

(I)

in which
n is 0 or 1,
m is 0 or a positive integer, preferably 0, 1 or 2,
$R^1$, $R^2$, $R^3$, $R^4$, $R^5$, $R^6$, independently of one another, are selected from the group consisting of hydrogen, halogen, aliphatic hydrocarbon groups, aromatic hydrocarbon groups and $C_{1-40}$-alkoxy groups,
$R^7$, $R^8$, $R^9$, $R^{10}$, $R^{11}$, $R^{12}$, $R^{13}$, $R^{14}$, $R^{15}$, $R^{16}$, independently of one another, are selected from the group consisting of hydrogen and aliphatic hydrocarbon groups, $R^{17}$, $R^{18}$, $R^{19}$, $R^{20}$, independently of one another, are selected from the group consisting of hydrogen, halogens and aliphatic hydrocarbon groups, it being possible for $R^{17}$ and $R^{19}$ also to be bonded to one another in such a way that they form a single ring or a ring system comprising a plurality of rings, it being possible for the ring or the rings to be saturated or unsaturated,
with at least one 1-olefin of the formula (II)

in which $R^{21}$ and $R^{22}$, independently of one another, are selected from the group consisting of hydrogen and hydrocarbon groups, in the presence of a selected metallocene catalyst.

Cycloolefins of the formula (I), in which n is 0 and m is 0 or 1, $R^7$, $R^8$, $R^{15}$, $R^{16}$, $R^{17}$ and $R^{19}$ are hydrogen and $R^1$, $R^2$, $R^3$, $R^6$, $R^{18}$ and $R^{20}$, independently of one another, are selected from the group consisting of hydrogen and $C_{6-10}$-aryl groups and $C_{1-8}$-alkyl groups, are preferably used.

1-Olefins of the formula (II), in which $R^{21}$ and $R^{22}$, independently of one another, are selected from the group consisting of hydrogen, $C_{6-10}$-aryl radicals and $C_{1-20}$-alkyl radicals, are furthermore preferably used. Examples of very particularly preferred 1-olefins of the formula (II) are ethene and propene.

The copolymerization of ethene and norbornene is particularly preferred.

The copolymers according to the invention are prepared with ring-retaining polymerization, i.e. the bi- or polycyclic structure of the monomer units used are retained in the polymerization.

BRIEF DESCRIPTION OF DRAWINGS

The invention is described in detail below with reference to the drawings, wherein like numerals designate similar parts. In the drawings.

DETAILED DESCRIPTION

Figure 1:
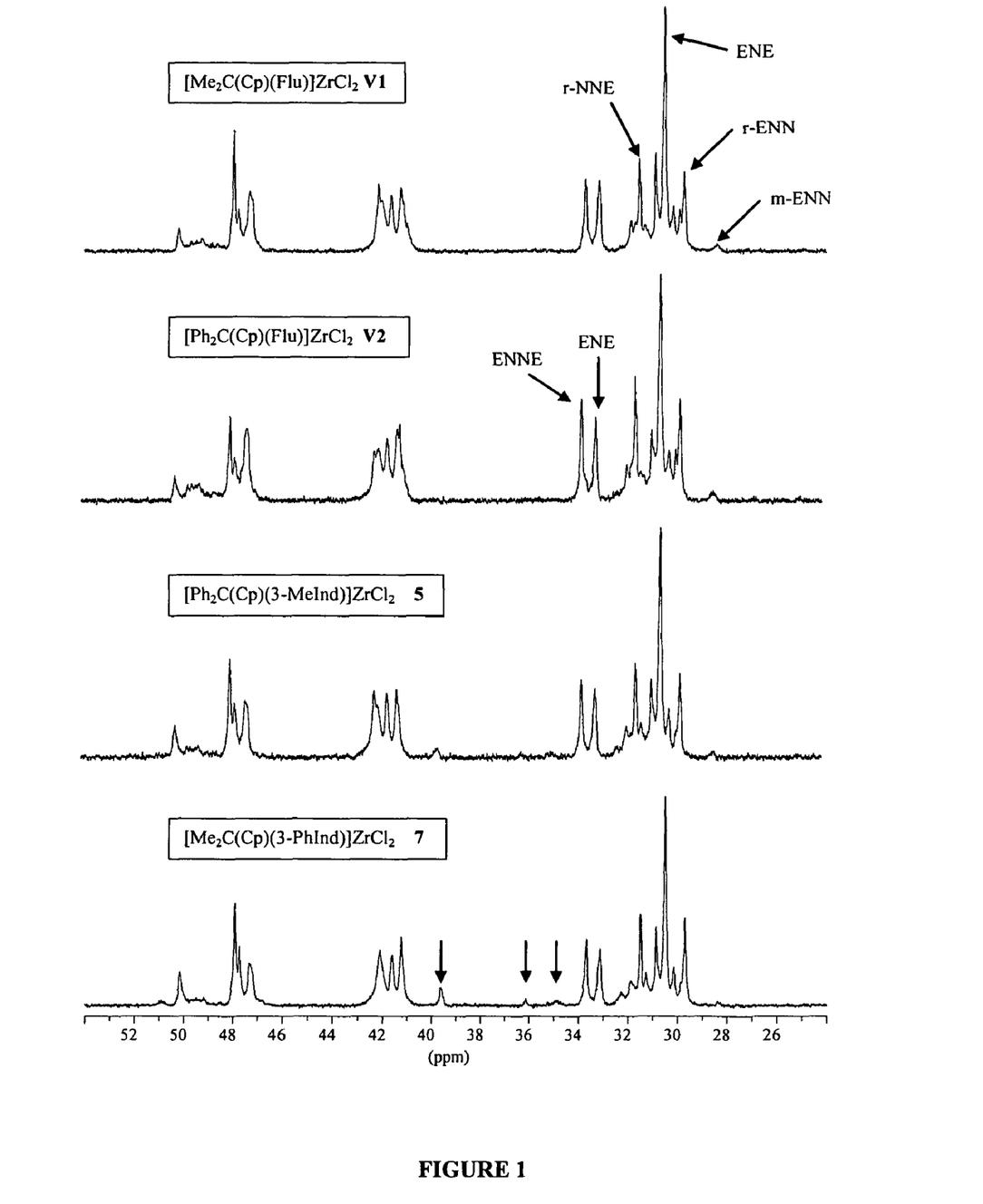
FIG. 1: $^{13}$C-NMR spectra of the ethene/norbornene copolymers ($X_N \approx 0.53$) prepared using the metallocenes (V1), (V2), (5) and (7), in each case in combination with MAO.
Figure 2:
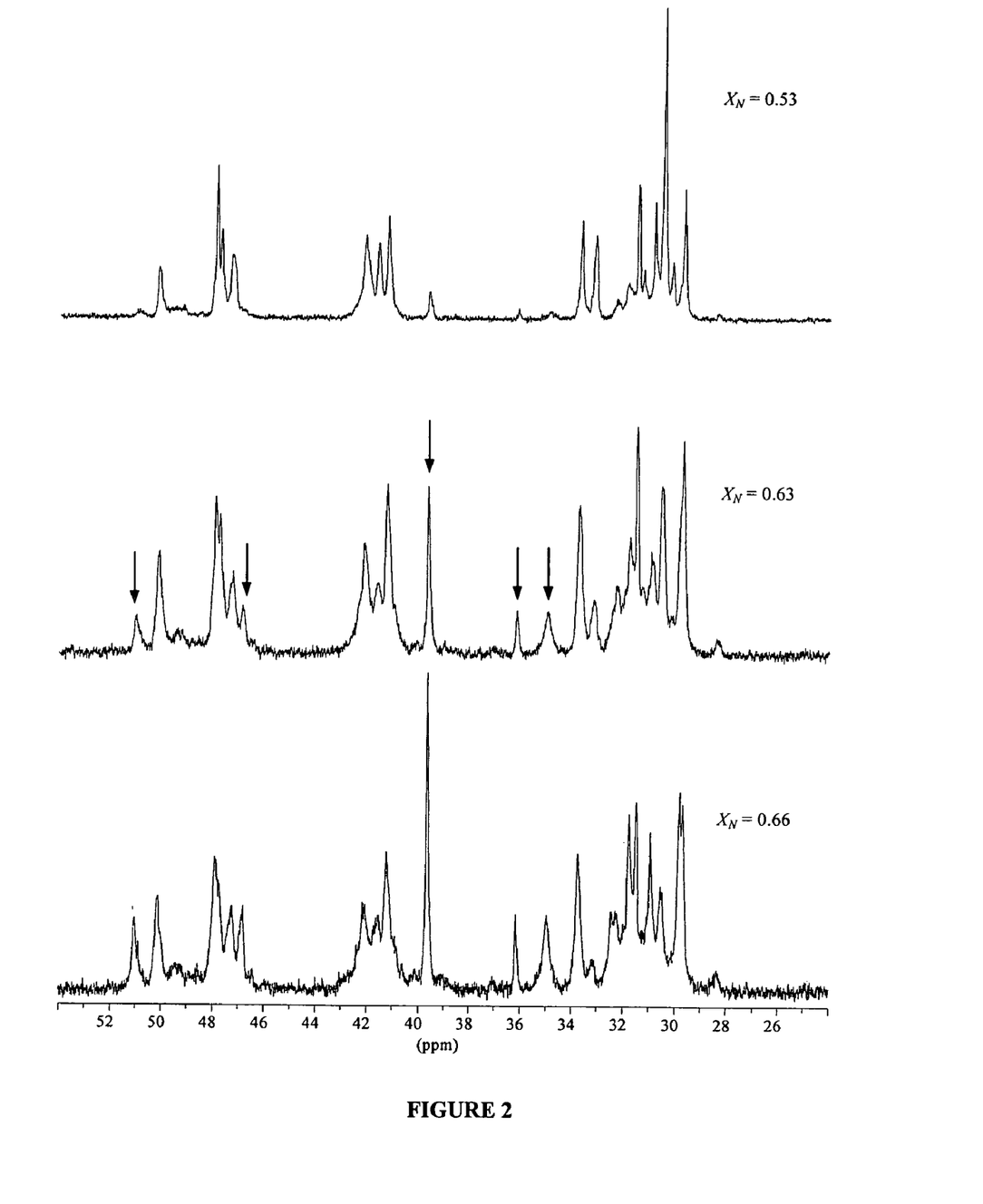
FIG. 2: $^{13}$C-NMR spectra of ethene/norbornene copolymers having different norbornene contents, prepared using the system [Me$_2$C(Cp)(3-PhInd)]ZrCl$_2$ (7)/MAO.
Figure 3:
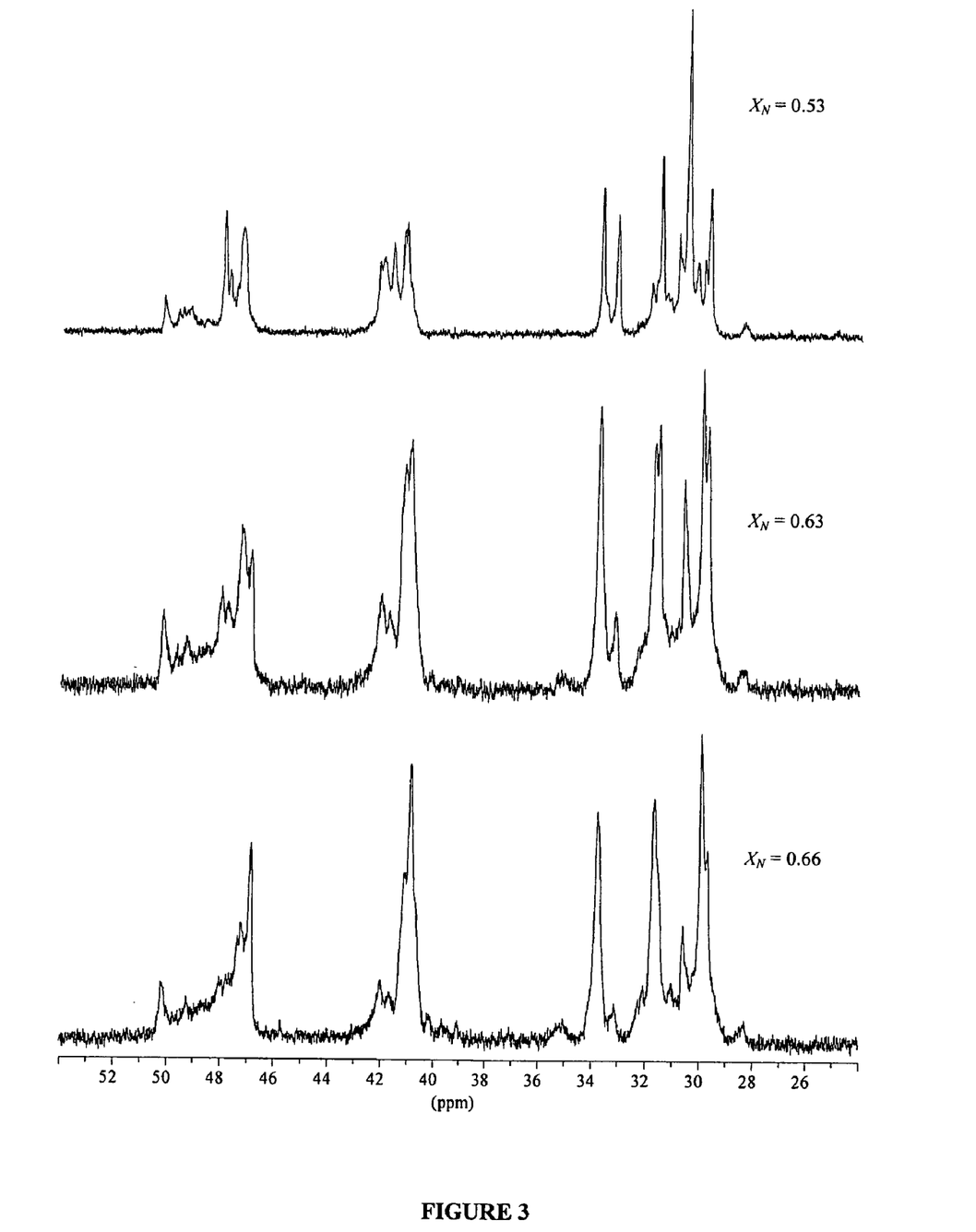
FIG. 3: $^{13}$C-NMR spectra of ethene/norbornene copolymers having different norbornene contents, prepared using the system [Ph$_2$C(Cp)(Flu)]ZrCl$_2$ (V2)/MAO.
Figure 4:
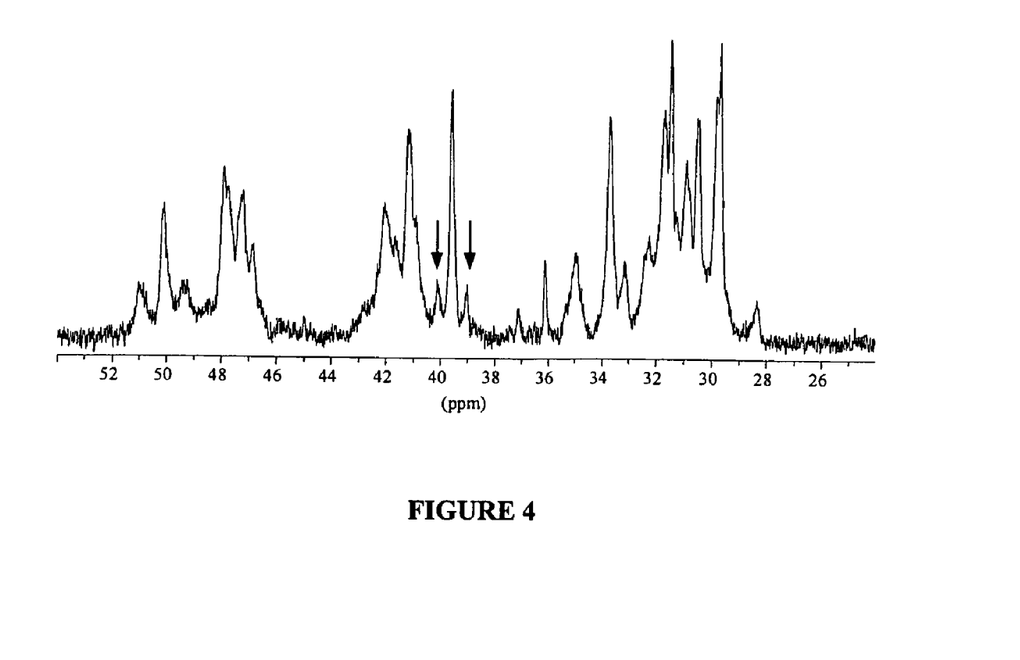
FIG. 4: $^{13}$C-NMR spectrum of an ethene/norbornene copolymer ($X_N$=0.67) prepared using the system [Me$_2$C(Cp)(3-MeInd)]ZrCl$_2$ (1)/MAO.
Figure 5:
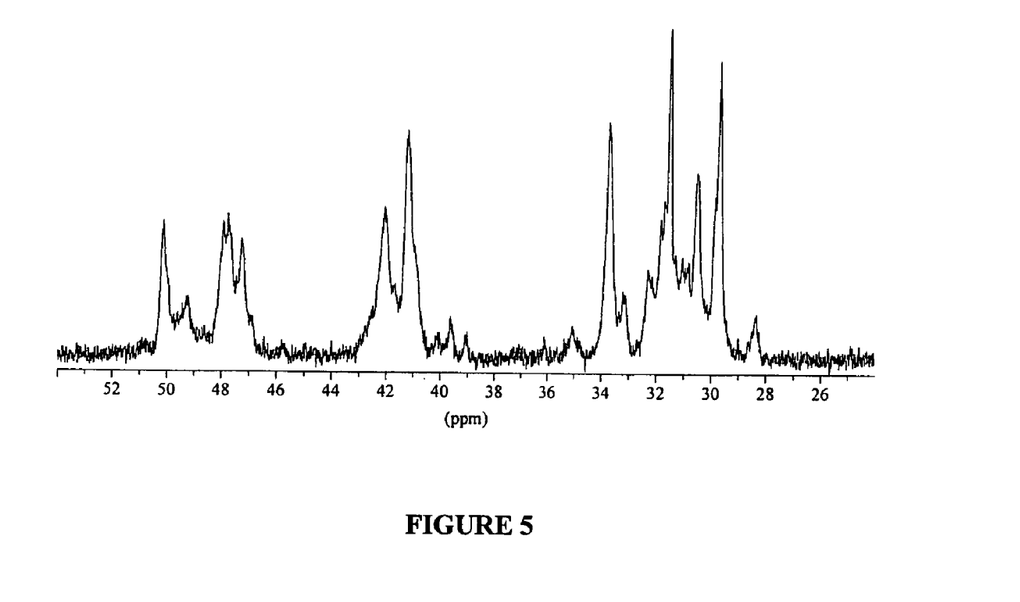
FIG. 5: $^{13}$C-NMR spectrum of an ethene/norbornene copolymer ($X_N$=0.67) prepared using the system [Me$_2$C(Cp)(3-iPrInd)]ZrCl$_2$ (3)/MAO.
Figure 6:
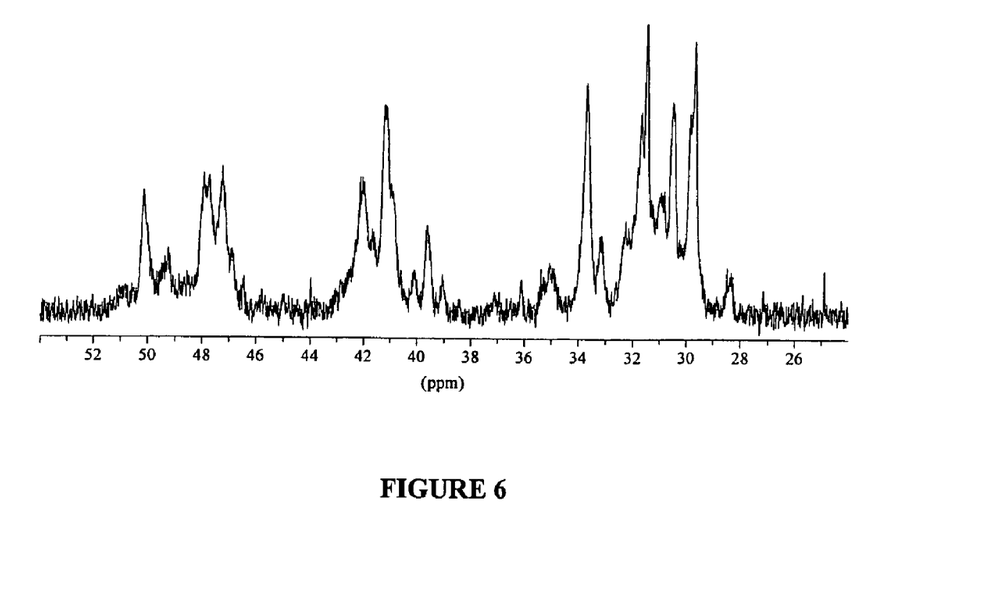
FIG. 6: $^{13}$C-NMR spectrum of an ethene/norbornene copolymer ($X_N$=0.67) prepared using the system [Ph$_2$C(Cp)(3-MeInd)]ZrCl$_2$ (5)/MAO.
Figure 7:
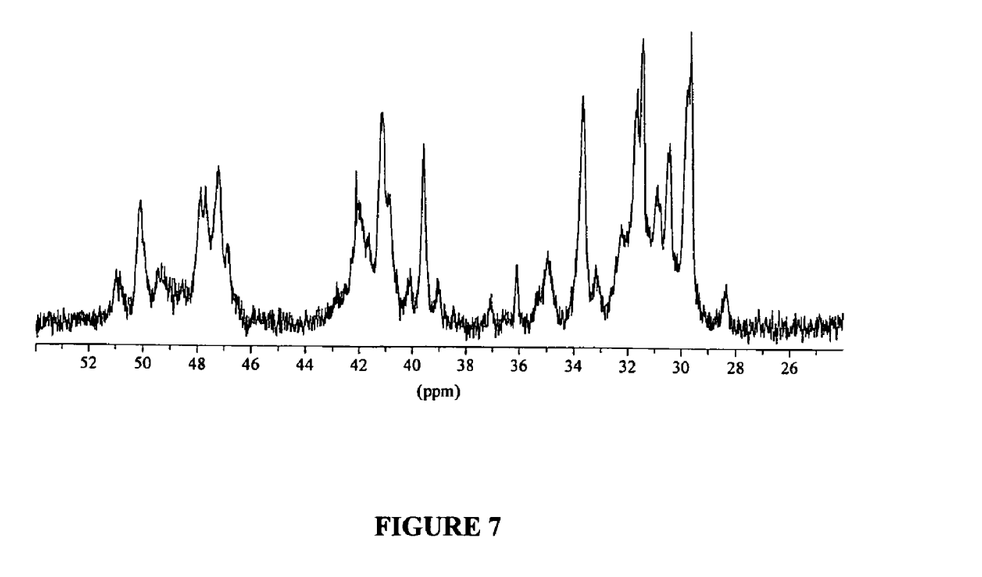
FIG. 7: $^{13}$C-NMR spectrum of an ethene/norbornene copolymer ($X_N$=0.66) prepared using the system [Me$_2$C(Cp)(2,3-Me$_2$Ind)]ZrCl$_2$ (6)/MAO.

The invention is described in detail below with reference to several embodiments and numerous examples. Such discussion is for purposes of illustration only. Modifications to particular examples within the spirit and scope of the present invention, set forth in the appended claims, will be readily apparent to one of skill in the art. Terminology used herein is given its ordinary meaning consistent with the exemplary definitions set forth immediately below.

According to the invention, the catalyst system used is one which contains metallocene compounds of the following formula (III)

(III)

in which
M is a metal of group IIIb, IVb, Vb and VIb of the Periodic Table of the Elements, preferably a metal of group IV and very particularly preferably zirconium,
$R^{31}$ and $R^{32}$ are identical or different and are selected from the group consisting of hydrogen, halogen atoms, $C_{1-40}$-alkyl groups, $C_{1-40}$-alkoxy groups, $C_{6-10}$-aryl groups, $C_{6-10}$-aryloxy groups, $C_{7-40}$-arylalkyl groups, $C_{7-40}$-alkylaryl groups, it being possible for all alkyl groups to be saturated or unsaturated; $R^{31}$ and $R^{32}$ are preferably halogen and very particularly preferably chlorine, and $L_1$ and $L_2$, independently of one another, are ligands which in each case contain at least one cyclopentadienyl ring, the radicals $R^{31}$, $R^{32}$, $L_1$ and $L_2$ being selected so that the metallocene compound has no $C_s$ symmetry in relation to the centroid-M-centroid plane.

Examples of ligands $L_1$ and $L_2$ are unsubstituted and substituted cyclopentadienyl ligands or unsubstituted and substituted indenyl ligands.

According to the invention, a catalyst system which contains metallocene compounds of the following formula (IIIa)

(IIIa)

is preferably used. M is a metal of group IIIb, IVb, Vb and VIb of the Periodic Table of the Elements. M is preferably a metal of group IV and very particularly preferably zirconium.

$R^{31}$ and $R^{32}$ are identical or different and are selected from the group consisting of hydrogen, halogen atoms, $C_{1-40}$-alkyl groups, $C_{1-40}$-alkoxy groups, $C_{6-10}$-aryl groups, $C_{6-10}$-aryloxy groups, $C_{7-40}$-arylalkyl groups, $C_{7-40}$-alkylaryl groups, it being possible for all alkyl groups to be saturated or unsaturated. Both are preferably halogen and very particularly preferably chlorine.

$R^{33}$, $R^{34}$, $R^{35}$, $R^{36}$, $R^{37}$, $R^{38}$, $R^{39}$, $R^{310}R^{311}$ and $R^{312}$ may be identical or different and are selected from the group consisting of hydrogen, halogen atoms, $C_{1-40}$-alkyl groups, $C_{1-40}$-alkoxy groups, $C_{6-10}$-aryl groups, $C_{6-10}$-aryloxy groups, $C_{7-40}$-arylalkyl groups, $C_{7-40}$-alkylaryl groups, it being possible for all alkyl groups to be saturated or unsaturated. One or more α-substituted pairs from the group $R^{33}$, $R^{34}$, $R^{35}$, $R^{36}$ and $R^{37}$ and from the group $R^{38}$, $R^{39}$, $R^{310}$, $R^{311}$ and $R^{312}$ may also form an alkyl chain together, so that one or more rings are formed. $R^{37}$ and $R^{38}$ preferably form a $C_{1-20}$-alkylene bridge, very particularly preferably a methylene bridge, and in particular an alkyl-substituted or aryl-substituted methylene bridge which is substituted in particular by two phenyl radicals or two methyl radicals.

What is decisive for the compounds of the formula IIIa is that the substituents $R^{33}$, $R^{34}$, $R^{35}$, $R^{36}$, $R^{37}$, $R^{38}$, $R^{39}$, $R^{310}$, $R^{311}$ and $R^{312}$ are chosen so that the metallocene compound has no $C_s$ symmetry in relation to the centroid-M-centroid plane.

Catalysts of the formula IIIa, in which
$R^{37}$ and $R^{38}$ together form a $C_1$-$C_{20}$-alkylene bridge, in particular an alkyl-substituted or phenyl-substituted methylene bridge,
$R^{33}$, $R^{34}$, $R^{35}$ and $R^{36}$ are hydrogen,
$R^{39}$ and $R^{312}$, independently of one another, are selected from the group consisting of hydrogen, halogen atoms, $C_{1-40}$-alkyl groups, $C_{1-40}$-alkoxy groups, $C_{6-10}$-aryl groups, $C_{6-10}$-aryloxy groups, $C_{7-40}$-arylalkyl groups, $C_{7-40}$-alkylaryl groups, and $R^{310}$ and $R^{311}$ are different and are selected from the group consisting of halogen atoms, $C_{1-40}$-alkyl groups, $C_{1-40}$-alkoxy groups, $C_{6-10}$-aryl groups, $C_{6-10}$-aryloxy groups, $C_{7-40}$-arylalkyl groups, $C_{7-40}$-alkylaryl groups, it being possible for all alkyl groups to be saturated or unsaturated, are particularly preferably used.

Very particularly preferably used metallocene compounds correspond to the formula (IV):

(IV)

in which
M is a metal of group IIIb, IVb, Vb and VIb of the Periodic Table of the Elements, preferably a metal of group IV and very particularly preferably zirconium, $R^{313}$ and $R^{313a}$, independently of one another, are selected from the group consisting of hydrogen, $C_1$-$C_4$-alkyl or aryl, in particular from hydrogen, methyl and phenyl, preferably at least one of the radicals $R^{313}$ or $R^{313a}$ not being hydrogen,
$R^{311}$ is selected from the group consisting of hydrogen, $C_1$-$C_4$-alkyl and aryl, preferably of methyl, ethyl, isopropanyl, tert.-butyl and phenyl, and
$R^{312}$ is selected from the group consisting of hydrogen and $C_1$-$C_4$-alkyl, preferably of hydrogen and methyl.

Compounds of the formula IV, in which at least one of the radicals $R^{311}$, $R^{312}$, $R^{313}$ or $R^{313a}$ is aryl, preferably phenyl, or in which $R^{311}$ or $R^{312}$ is tert-butyl, are novel and are likewise the subject of the present invention. The compounds containing aryl substituents are distinguished by high stability of the complexes, which ensure long activity during the copolymerization.

Examples of likewise particularly preferably used metallocene catalysts are the compounds of the formulae (1) to (7) mentioned below:

(1)

(2)

(3)

(4)

(5)

(6)

(7)

In the process according to the invention, an aluminoxane, which preferably has the formula VIa for the linear type and/or the formula VIb for the cyclic type where, in the formulae VIa and VIb, the radicals R are identical or different and are a $C_1$-$C_6$-alkyl group, a $C_6$-$C_{18}$-aryl group, benzyl or hydrogen and p is an integer from 2 to 50, preferably from 10 to 35, is preferably used as a cocatalyst. Preferably, the radicals R are identical and are methyl, isobutyl, phenyl or benzyl, particularly methyl.

If the radicals R are different, they are preferably methyl and hydrogen or alternatively methyl and isobutyl, hydrogen or isobutyl preferably being present in a numerical proportion of from 0.01 to 40% (of the radicals R).

The aluminoxane can be prepared in various ways by known processes. One of the methods is, for example, to react an aluminum-hydrocarbon compound and/or a hydridoaluminum-hydrocarbon compound with water (gaseous, solid, liquid or bound, for example as water of crystallization) in an inert solvent (such as toluene). For the preparation of an aluminoxane having different alkyl groups R, two different trialkylaluminums ($AlR'_3$+$AlR''_3$) are reacted with water in accordance with the desired composition (S. Pasynkiewicz, Polyhedron 9 (1990) 429, EP-A-302 424). The exact three-dimensional structure of the aluminoxanes is not known.

Regardless of the method of preparation, common to all aluminoxane solutions is a varying content of unreacted aluminum starting compound, which is present in free form or as an adduct. It is also possible to apply the aluminoxane to a support and then to use it as a suspension in supported form. A plurality of processes for application to supports are known, for example from EP-A-578,838. Silica gel can be used as a support.

It is possible to preactivate the metallocene to be used for the process according to the invention before the use in the polymerization reaction with a cocatalyst, in particular an aluminoxane. This substantially increases the polymerization activity.

The preactivation of the transition metal compound is carried out in solution. Preferably, the metallocene is dissolved in a solution of the aluminoxane in an inert hydrocarbon. A suitable inert hydrocarbon is an aliphatic or aromatic hydrocarbon. Toluene is preferably used.

The concentration of the aluminoxane in the solution is in the range from about 1% by weight to the saturation limit, preferably from 5 to 30% by weight, based in each case on the total solution. The metallocene can be used in the same concentration but it is preferably used in an amount of from $10^{-4}$ to 1 mol per mole of aluminoxane. The preactivation time is from 5 minutes to 60 hours, preferably from 5 to 60 minutes. A temperature of from −78 to 100° C., preferably from 0 to 70° C., is employed.

With the aid of the metallocene, a prepolymerization can be effected. The olefin used in the polymerization or one of the olefins used in the polymerization is or are preferably used for the prepolymerization.

The metallocene can also be applied to a support. Suitable supports are, for example, silica gels, aluminas, solid aluminoxane or other inorganic support materials. Another suitable support material is a polyolefin powder in finely divided form.

In a further possible development of the process according to the invention, a salt-like compound of the formula $R^{3'}_xH_{4-x}BR^{4'}_4$ or of the formula $R^{3'}_3PHBR^{4'}_4$ is used as a cocatalyst, instead of or in addition to an aluminoxane. Here, x=1, 2 or 3, $R^{3'}$=alkyl or aryl, identical or different, and $R^{4'}$=aryl which may also be fluorinated or partly fluorinated. In this case, the catalyst consists of the reaction product of a metallocene with one of said compounds (EP-A-277 004).

If solvent is added to the reaction mixture, customary inert solvents, such as aliphatic or cycloaliphatic hydrocarbons, gasoline fractions or hydrogenated diesel oil fractions or toluene, may be used for this purpose.

The metallocene is preferably used in a concentration, based on the transition metal, of from $10^{-1}$ to $10^{-8}$ mol, preferably from $10^{-2}$ to $10^{-7}$ mol, particularly preferably from $10^{-3}$ to $10^{-7}$ mol, of transition metal per $dm^3$ of reactor volume. The aluminoxane is used in a concentration of from $10^{-4}$ to $10^{-1}$, preferably from $10^{-4}$ to $2*10^{-2}$ mol, per $dm^3$ of reactor volumes, based on the content of aluminum. In principle, however, higher concentrations are also possible.

The copolymers prepared according to the invention are distinguished by a novel microstructure. These copolymers can be used for the production of moldings of any desired type. It is possible to use any desired shaping methods, for example injection molding, injection blow molding or extrusion.

In particular, the copolymers according to the invention are used for the production of films, optical components or transparent containers. The films are preferably used as optical films, as blister films or as other types of packaging films. In the area of optical components, preferably lenses, prisms and optical waveguide plates, or micro titer plates to be used in diagnosis, may be mentioned. The transparent containers are preferably used in medical technology, for example as syringe barrels.

The following examples explain the invention. A limitation is not intended thereby.

The metallocenes used in polymerization experiments were prepared by general synthesis methods described in the literature. Owing to the air sensitivity and moisture sensitivity of organometallic compounds, all work was carried out under an argon inert gas atmosphere by means of the Schlenk technique in closed apparatuses having pressure relief valves. The glass apparatuses were evacuated and flushed with inert gas before use. Filtrations were effected via closed G3 frits by means of superatmospheric inert gas pressure. In the case of the filtrations of the catalyst syntheses, a Celite® layer (about 3 cm) was additionally applied in order to ensure unhindered filtration. The inert gas used was argon from Messer, having a purity of 99.998%.

The synthesis of the compound (5) ([Ph$_2$C(Cp)(3-MeInd)]ZrCl$_2$) is to be described as a typical example of the preparation of the metallocenes used.

Synthesis of 1-methylindene/3-methylindene 140 ml (0.35 mol) of a 2.5 M solution of n-butyllithium in toluene were added dropwise to a solution of 45.0 g of indene (0.35 mol) in 200 ml of THF at 0° C. in the course of 30 min in a 500 ml four-necked flask having a dropping funnel. After warming up to room temperature, the solution was stirred for a further hour. Thereafter, it was again cooled to 0° C., and 99.4 g (0.70 mol) of iodomethane were added dropwise in the course of 2 h. After warming up to room temperature, stirring was effected for a further 24 h. The solvents were distilled off on a rotary evaporator at a bath temperature of 40° C. and 100 mbar. The black residue was extracted by shaking three times with 200 ml of pentane each time. After concentration of the combined pentane fractions on a rotary evaporator, the crude product was fractionated over a 25 cm Vigreux column. 28.6 g (0.22 mol; 63% yield) of colorless methylindene were obtained under a vacuum from a diaphragm pump at 19 mbar and a top temperature of 71-73° C. The $^1$H-NMR spectrum shows an isomer mixture of 1- and 3-methylindene in the ratio of 1:1.

$^1$H-NMR (CDCl$_3$, TMS, δ(ppm)): 7.44-7.16 (4H, m, aromatic protons); 6.76 (1H, dd, olefinic proton on the C$_5$ ring; 1-methylindene); 6.46 (1H, dd, olefinic proton on the C$_5$ ring; 1-methylindene); 6.18 (1H, m, olefinic proton on the C$_5$ ring; 3-methylindene); 3.47 (1H, m, aliphatic proton on the C$_5$ ring; 1-methylindene); 3.29 (2H, m, aliphatic protons on the C$_5$ ring; 3-methylindene); 2.16 (3H, m, —CH$_3$; 3-methylindene); 1.30 (3H, d, —CH$_3$; 1-methylindene).

Synthesis of 6,6-diphenylfulvene 78.0 g (0.24 mol) of sodium methylate solution were initially introduced into a 500 ml four-necked flask at 50° C. and 45.6 g (0.25 mol) of benzophenone were then added. After complete dissolution, 20 g (0.30 mol) of freshly distilled cyclopentadiene were added dropwise in the course of 30 min at 45-50° C. After the end of the addition, stirring was effected for a further 2 h at room temperature, a dark red suspension forming. This was filtered over a G3 frit and the solid was washed four times with 25 ml of ethanol each time. After drying in a vacuum from an oil pump, 47.1 g (0.20 mol; 82% yield) of red 6,6-diphenylfulvene were obtained.

$^1$H-NMR (CDCl$_3$, TMS, δ(ppm)): 7.42-7.32 (10H, m, aromatic protons); 6.62 (2 H, m, olefinic protons); 6.32 (2H, m, olefinic protons).

Synthesis of 1-(cyclopenta-1,3-dienyldiphenylmethyl)-3-methyl-1H-indene 31.4 ml (78.3 mmol) of a 2.5 M solution of n-butyllithium in toluene were added dropwise to a solution of 10.2 g (78.3 mmol) of 1-methylindene/3-methylindene in 100 ml of diethyl ether at 0° C. in the course of 5 min in a 250 ml four-necked flask having a dropping funnel. After warming at room temperature, the solution was stirred for a further hour. Thereafter, cooling to 0° C. was effected again and a solution of 18.0 g (78.3 mmol) of 6,6-diphenylfulvene in 10 ml of diethyl ether was added dropwise in the course of 10 min. Stirring was effected for a further 3 h at room temperature. The beige suspension was poured onto ice water/5.9 g (1 eq) of glacial acetic acid. The phases were separated and the aqueous phase was extracted three times with 30 ml of diethyl ether each time. The combined organic phases were washed three times with 30 ml of water each time and once with 30 ml of saturated sodium chloride solution and dried over magnesium sulfate. After removal of the solvents on a rotary evaporator, the yellow oil was stored overnight at −20° C. After seeding, white crystals crystallized out and were suspended in 10 ml of pentane at about 0° C. and filtered with suction over a frit. After drying in a vacuum from an oil pump, 15.5 g (43.0 mmol; 55% yield) of white powder (ligand compound) were obtained. The $^1$H-NMR spectrum shows an isomer mixture of 1-(cyclopenta-1,3-dienyldiphenylmethyl)-3-methyl-1H-indene and of 1-(cyclopenta-1,4-dienyldiphenylmethyl)-3-methyl-1H-indene. $^1$H-NMR (CDCl$_3$, TMS, δ(ppm)): 7.45-6.89 (14H, m, aromatic protons, broad); 6.43-6.16 (4H, m, olefinic protons on the C$_5$ rings, broad); 4.87 (1H, m, methine proton on the indene); 3.04 (2H, s, methylene protons on the Cp); 1.86 (3H, m, —CH$_3$).

Synthesis of the Compound (5)
([Ph$_2$C(Cp)(3-MeInd)]ZrCl$_2$)

8.4 ml (21 mmol) of a 2.5 M solution of n-butyllithium in toluene were added dropwise at 0° C. to a solution of 3.6 g (10 mmol) of 1-(cyclopenta-1,3-dienyldiphenylmethyl)-3-methyl-1H-indene in 50 ml of toluene/3.2 ml (40 mmol) of THF in the course of 2 min in a 100 ml three-necked flask. The orange solution was stirred for 2 h at 50° C. After cooling to 0° C., 2.3 g (10 mmol) of zirconium tetrachloride were added in one portion. After warming to room temperature, the red suspension was stirred for a further 3 h. This suspension was poured into 200 ml of toluene at 80° C. Stirring was effected for 5 min, the suspension was filtered over a G3 frit having a Celite layer and the filter residue was washed three times with 20 ml of toluene at 80° C. each time. The combined filtrates were concentrated in vacuo to about 150 ml and left to stand overnight at −20° C. The solid which crystallized out was filtered off over a G3 frit and washed with a little cold toluene. After drying in a vacuum from an oil pump, 4.1 g (6.33 mmol, 63% yield, calculated without toluene) of orange [Ph$_2$C(Cp)(3-MeInd)]ZrCl$_2$ were obtained. The metallocene still contained 58 mol % of toluene.

$^1$H-NMR (CDCl$_3$, δ(ppm)): 7.83-6.66; 6.23 (14H, m, protons on the C$_6$ ring); 6.56-6.50; 5.52-5.47 (5H, m, protons on the C$_5$ rings); 2.39 (3H, s, —CH$_3$).

EXAMPLES 1-51

All polymerization experiments were carried out in a 1.5 l steel autoclave by the method described below. The maximum permissible internal operating pressure was 25 bar. The thermostating was effected with a circulation pump by means of superheated steam and process water. A crossbeam stirrer driven in directly via a magnetic clutch served for thorough mixing. Polymerization was effected at 70° C. in toluene as a solvent. The stirring speed was 850 rpm.

The amount of metallocene required for the polymerization was calculated so that from 20 to 30 g of polymer were to be expected. For the preparation of the catalyst solution, as a rule about 10 mg of metallocene were accurately weighed in and dissolved in the same number of milliliters of methylaluminoxane (=MAO) (10% by weight of MAO in toluene). The required amount of catalyst solution was taken up with a syringe and made up to 5 ml with MAO solution. In the case of very weakly active catalyst systems, the metallocene was weighed in directly and dissolved in 5 ml of MAO. The total amount of methylaluminoxane used in each example was thus 1.34 g of MAO (21.4 mmol of Al).

Before each polymerization, the autoclave was cleaned by boiling 1 l of dearomatized hydrocarbon fluid, trademark EXXSOL®, from ExxonMobil Chemical Company, USA and 10 ml of MAO solution at 90° C. in it. The norbornene was introduced into the autoclave in an argon countercurrent and 10 ml of MAO solution were added. After thermostating of the comonomer at the desired reaction temperature, the catalyst solution was added by means of a syringe. The required ethene pressure was applied with stirring and kept constant for the entire reaction time by means of a pressure reducer. The consumption of ethene was monitored by means of a flow meter. The reaction volume was 600 ml and the reaction time 15 min.

After the polymerization, the ethene feed was stopped and the excess pressure released. The reaction solution was transferred to a bottle having a screw cap and diluted with about 300 ml of toluene. For precipitation of the copolymer, it was slowly stirred into about 1 l of acetone with vigorous stirring (in an emulsification machine ULTRA TURRAX®, from IKA Werke GmbH and Co, Germany) and 3 ml of 37% hydrochloric acid were added. The precipitated copolymer was filtered off over a Büchner funnel and washed again with acetone and water. The drying was effected overnight at 60° C. in a vacuum drying oven.

In the polymerization experiments, the following metallocenes were used as catalysts:

(V1) R$^1$ = Me
 ([Me$_2$C(Cp)(Fluo)]ZrCl$_2$)
(V2) R$^1$ = Ph
 ([Ph$_2$C(Cp)(Fluo)]ZrCl$_2$)

(1) R$^1$ = Me R$^2$ = H R$^3$ = Me
 ([Me$_2$C(Cp)(3-MeInd)]ZrCl$_2$)
(2) R$^1$ = Ph R$^2$ = H R$^3$ = Et
 ([Me$_2$C(Cp)(3-EtInd)]ZrCl$_2$)
(3) R$^1$ = Me R$^2$ = H R$^3$ = iPr
 ([Me$_2$C(Cp)(3-iPrInd)]ZrCl$_2$)
(4) R$^1$ = Me R$^2$ = H R$^3$ = tBu
 ([Me$_2$C(Cp)(3-tBuInd)]ZrCl$_2$)
(5) R$^1$ = Ph R$^2$ = H R$^3$ = Me
 ([Ph$_2$C(Cp)(3-MeInd)]ZrCl$_2$)
(6) R$^1$ = Me R$^2$ = Me R$^3$ = Me
 ([Me$_2$C(Cp)(2,3-Me$_2$Ind)]ZrCl$_2$)
(7) R$^1$ = Me R$^2$ = H R$^3$ = Ph
 ([Me$_2$C(Cp)(3-PhInd)])

Polymers obtained according to these examples were measured by $^{13}$C-NMR spectroscopy. The measurements were effected on a DMX 500 NMR spectrometer from Brucker at 353 K. For this purpose, from 200 to 300 mg of polymer were dissolved in 3 ml of 1,1,2,2-tetrachloroethane-d$_2$ at elevated temperature in a 10 mm NMR tube. In order to obtain integratable $^{13}$C-NMR spectra, measurement was effected by the inverse gated decoupling method. Spin lattice relaxation and nuclear Overhauser effect (NOE) then no longer have any influence on the signal intensities. The chemical shift was based on 1,1,2,2-tetrachloroethane at 74.24 ppm. The spectra were evaluated using the WIN-NMR program from Brucker. The most important parameters are summarized as follows:

| | |
|---|---|
| Measuring frequency | 125.75 MHz |
| Measuring temperature | 353 K |
| Sweep width | 39682 Hz |
| Relaxation time | 7.4 s |
| Number of scans | 5104 |
| Solvent | C$_2$D$_2$Cl$_4$ |

The glass transition temperatures were determined by means of differential scanning calorimetry (DSC) using an apparatus from Perkin-Elmer (type DSC 7). For this purpose, 4-6 mg of the polymer were weighed into an aluminum crucible and melted in a temperature range of −10° C. and alternatively 200-300° C. The glass transition temperatures were determined from the measurements of the second heating curve. The heating and cooling rate was 20 K./min.

The reduced viscosities (viscosity numbers) of the polymers were determined using an Ubbelohde viscometer (capillary 0 a). For this purpose, the dynamic viscosity of the solvent and of the polymer solution was determined. The concentration of the polymer solution was 500 mg of polymer in 100 ml of decalin (at 135° C.), the correction factor for conversion to the volume of the decalin at room temperature was 0.9. 1 g/l of antioxidant -pentaerythritol tetrakis(3-(3,5-di-tert-butyl-4-hydroxyphenyl)propionate) trademark of IRGANOX 1010® from Ciba Specialty Chemical Corp, Delaware, USA was added to the decalin for thermal stabilization. The measurement was effected using the processor viscosity measuring system PVS 1 (version 2.45) from Lauda at 135° C.

$$\eta_{red} = \left(\frac{\eta}{\eta_0} - 1\right) \cdot \frac{1}{c}$$

Here, the meanings are as follows:

| | |
|---|---|
| $\eta_{red}$ | reduced viscosity (viscosity number) in ml/g |
| $\eta$ | dynamic viscosity of the solution in mPa · s |
| $\eta_0$ | dynamic viscosity of the solvent in mPa · s |
| c | concentration in g/ml |

The additional experimental conditions and results of the polymerization experiments are shown in the tables below. For individual examples, spectra are shown in the attached figures.

TABLE 1

Examples 1-51 Synthesis

| Ex. No. | Metallocene | Met. [mg] | Met. [µmol] | Al/Zr | c(Nb) [mol/l] | p(Ethene) [bar] | COC [g] | Activity [kg (COC)/ (mmol (Zr) h)] |
|---|---|---|---|---|---|---|---|---|
| 1 | 1 | 0.5 | 1.261 | 16970 | 5.6 | 19 | 32.3 | 102 |
| 2 | | 0.5 | 1.261 | 16970 | 7.8 | 19 | 21.0 | 87 |
| 3 | | 1 | 2.522 | 8490 | 7.8 | 10 | 2.1 | 58 |
| 4 | | 2 | 5.044 | 4240 | 7.8 | 6 | 2.1 | 34 |
| 5 | | 8 | 20.176 | 1060 | 7.8 | 2 | 16.2 | 3 |
| 6 | | 13.6 | 34.299 | 624 | 7.8 | 1 | 14.5 | 2 |
| 7 | 2 | 0.5 | 1.218 | 17570 | 5.6 | 19 | 39.8 | 131 |
| 8 | | 0.5 | 1.218 | 17570 | 7.8 | 19 | 32.6 | 107 |
| 9 | | 1 | 2.436 | 8780 | 7.8 | 10 | 25.2 | 41 |
| 10 | | 2 | 4.872 | 4390 | 7.8 | 6 | 24.6 | 20 |
| 11 | 3 | 0.5 | 1.178 | 18170 | 5.6 | 19 | 38.6 | 131 |
| 12 | | 0.5 | 1.178 | 18170 | 7.8 | 19 | 29.4 | 100 |
| 13 | | 1 | 2.356 | 9080 | 7.8 | 10 | 20.8 | 35 |
| 14 | | 3.4 | 8.009 | 2670 | 7.8 | 6.5 | 26.1 | 13 |
| 15 | | 2 | 4.711 | 4540 | 7.8 | 6 | 28.2 | 24 |
| 16 | | 3.2 | 7.538 | 2840 | 7.8 | 1 | 3.2 | 2 |
| 17 | 4 | 1 | 2.280 | 9390 | 5.6 | 19 | 28.5 | 50 |
| 18 | | 2 | 4.560 | 4690 | 7.8 | 19 | 48.6 | 43 |
| 19 | | 3 | 6.841 | 3130 | 7.8 | 10 | 46.7 | 27 |
| 20 | | 2 | 4.560 | 4690 | 7.8 | 6 | 6.7 | 6 |
| 21 | | 8.3 | 18.926 | 1130 | 7.8 | 4 | 31.4 | 7 |
| 22 | | 5 | 11.401 | 1880 | 7.8 | 2 | 1.8 | 0.5 |
| 23 | | 12.2 | 27.819 | 769 | 7.8 | 1 | 2.3 | 0.3 |
| 24 | 5 | 5 | 9.604 | 2230 | 5.6 | 19 | 70.9 | 30 |
| 25 | | 5 | 9.604 | 2230 | 7.8 | 19 | 37.6 | 16 |
| 26 | | 11.1 | 21.321 | 1000 | 7.8 | 10 | 59.8 | 9 |
| 27 | | 2 | 3.842 | 5570 | 7.8 | 6 | 2.5 | 3 |
| 28 | | 10.5 | 20.169 | 1060 | 7.8 | 1 | 8.6 | 2 |
| 29 | 6 | 0.2 | 0.487 | 43940 | 5.6 | 19 | 31.1 | 255 |
| 30 | | 0.2 | 0.487 | 43940 | 7.8 | 19 | 27.1 | 222 |
| 31 | | 0.4 | 0.974 | 21970 | 7.8 | 10 | 25.9 | 106 |
| 32 | | 0.5 | 1.218 | 17580 | 7.8 | 7.5 | 10.0 | 33 |
| 33 | | 0.5 | 1.218 | 17580 | 7.8 | 6 | 17.4 | 57 |
| 34 | | 1 | 2.436 | 8790 | 7.8 | 1 | 3.1 | 5 |
| 35 | 7 | 2 | 4.362 | 4910 | 5.6 | 19 | 33.9 | 32 |
| 36 | | 2 | 4.362 | 4910 | 7.8 | 19 | 24.4 | 30 |
| 37 | | 2 | 4.362 | 4910 | 7.8 | 10 | 19.7 | 18 |
| 38 | | 4 | 8.723 | 2450 | 7.8 | 6 | 18.1 | 8 |
| 39 | | 11.2 | 24.425 | 876 | 7.8 | 2 | 15.0 | 2 |
| 40 | | 16.1 | 35.111 | 609 | 7.8 | 1 | 9.1 | 1 |
| 41 | V1 | 0.2 | 0.463 | 46220 | 5.6 | 19 | 21.8 | 188 |
| 42 | | 0.3 | 0.694 | 30810 | 7.8 | 19 | 26.9 | 155 |
| 43 | | 0.6 | 1.389 | 15410 | 7.8 | 10 | 42.0 | 121 |
| 44 | | 0.5 | 1.157 | 18490 | 7.8 | 6 | 30.9 | 107 |
| 45 | V2 | 1 | 1.796 | 11920 | 5.6 | 19 | 41.9 | 93 |
| 46 | | 1 | 1.796 | 11920 | 7.8 | 19 | 32.8 | 73 |
| 47 | | 2 | 3.593 | 5960 | 7.8 | 10 | 42.1 | 47 |
| 48 | | 2 | 3.593 | 5960 | 7.8 | 8 | 35.2 | 39 |
| 49 | | 3.3 | 5.928 | 3610 | 7.8 | 6 | 44.7 | 30 |

TABLE 1-continued

Examples 1-51 Synthesis

| 50 | | 8.5 | 15.270 | 1400 | 7.8 | 2 | 18.8 | 5 |
| 51 | | 13.5 | 24.253 | 882 | 7.8 | 1 | 15.7 | 3 |

TABLE 2

Polymer Characteristics

| Ex. No | Metallocene | c(N)/c(E) | x(N) | X(N) (NMR) | X(N) (DSC) | T(g) [° C.] | η (red) [ml/g] |
|---|---|---|---|---|---|---|---|
| 1 | 1 | 2.4 | 0.71 | — | 0.36 | 90.7 | 60.2 |
| 2 | | 3.4 | 0.77 | — | 0.40 | 99.3 | 50.0 |
| 3 | | 6.9 | 0.87 | — | 0.47 | 135.2 | 60.2 |
| 4 | | 12.1 | 0.92 | 0.52 | 0.52 | 154.6 | 64.0 |
| 5 | | 40.9 | 0.98 | 0.64 | 0.62 | 196.7 | 67.0 |
| 6 | | 88.1 | 0.99 | 0.67 | 0.67 | 214.7 | 58.8 |
| 7 | 2 | 2.4 | 0.71 | — | 0.35 | 85.5 | 44.7 |
| 8 | | 3.4 | 0.77 | — | 0.40 | 106.5 | 49.6 |
| 9 | | 6.9 | 0.87 | — | 0.47 | 135.0 | 57.0 |
| 10 | | 12.1 | 0.92 | 0.53 | 0.52 | 154.5 | 62.0 |
| 11 | 3 | 2.4 | 0.71 | — | 0.32 | 73.9 | 77.5 |
| 12 | | 3.4 | 0.77 | — | 0.38 | 98.7 | 76.2 |
| 13 | | 6.9 | 0.87 | — | 0.47 | 133.3 | 82.4 |
| 14 | | 11.0 | 0.92 | 0.52 | 0.52 | 154.9 | 87.7 |
| 15 | | 12.1 | 0.92 | — | 0.54 | 161.2 | 79.3 |
| 16 | | 88.1 | 0.99 | 0.61 | 0.65 | 208.7 | 60.3 |
| 17 | 4 | 2.4 | 0.71 | — | 0.19 | 20.8 | 86.0 |
| 18 | | 3.4 | 0.77 | — | 0.25 | 43.8 | 90.4 |
| 19 | | 6.9 | 0.87 | — | 0.35 | 84.1 | 78.3 |
| 20 | | 12.1 | 0.92 | — | 0.40 | 105.3 | 60.1 |
| 21 | | 18.9 | 0.95 | 0.46 | 0.45 | 124.5 | 64.8 |
| 22 | | 40.9 | 0.98 | 0.52 | 0.52 | 154.9 | 48.3 |
| 23 | | 88.1 | 0.99 | — | 0.58 | 179.3 | 37.9 |
| 24 | 5 | 2.4 | 0.71 | — | 0.38 | 98.2 | 44.9 |
| 25 | | 3.4 | 0.77 | — | 0.43 | 119.7 | 45.9 |
| 26 | | 6.9 | 0.87 | 0.52 | 0.52 | 153.2 | 53.7 |
| 27 | | 12.1 | 0.92 | — | 0.56 | 172.6 | 57.2 |
| 28 | | 88.1 | 0.99 | 0.66 | 0.67 | 215.8 | 53.8 |
| 29 | 6 | 2.4 | 0.71 | — | 0.37 | 94.8 | 71.8 |
| 30 | | 3.4 | 0.77 | — | 0.42 | 111.6 | 83.8 |
| 31 | | 6.9 | 0.87 | — | 0.49 | 141.6 | 94.2 |
| 32 | | 9.4 | 0.90 | 0.51 | 0.51 | 152.3 | 95.4 |
| 33 | | 12.1 | 0.92 | — | 0.54 | 161.7 | 99.7 |
| 34 | | 88.1 | 0.99 | 0.66 | 0.66 | 211.8 | 99.0 |
| 35 | 7 | 2.4 | 0.71 | — | 0.35 | 84.1 | 20.7 |
| 36 | | 3.4 | 0.77 | — | 0.38 | 98.9 | 22.6 |
| 37 | | 6.9 | 0.87 | — | 0.46 | 131.0 | 27.7 |
| 38 | | 12.1 | 0.92 | 0.53 | 0.53 | 157.2 | 31.1 |
| 39 | | 40.9 | 0.98 | 0.64 | 0.63 | 198.4 | 31.5 |
| 40 | | 88.1 | 0.99 | 0.66 | 0.66 | 212.4 | 29.7 |
| 41 | V1 | 2.4 | 0.71 | — | 0.37 | 91.5 | 152.4 |
| 42 | | 3.4 | 0.77 | — | 0.41 | 109.7 | 164.5 |
| 43 | | 6.9 | 0.87 | — | 0.48 | 138.3 | 180.4 |
| 44 | | 12.1 | 0.92 | 0.54 | 0.53 | 158.2 | 181.3 |
| 45 | V2 | 2.4 | 0.71 | — | 0.36 | 90.4 | 338.6 |
| 46 | | 3.4 | 0.77 | — | 0.43 | 117.4 | 364.1 |
| 47 | | 6.9 | 0.87 | — | 0.50 | 146.8 | 297.0 |
| 48 | | 8.8 | 0.90 | 0.53 | 0.52 | 155.8 | 263.5 |
| 49 | | 12.1 | 0.92 | — | 0.55 | 171.3 | 207.9 |
| 50 | | 40.9 | 0.98 | 0.60 | 0.63 | 198.3 | 149.7 |
| 51 | | 88.1 | 0.99 | 0.65 | 0.66 | 210.2 | 102.1 |

TABLE 3

Proportion of norbornene in the different norbornene blocks

| Ex. No. | Metallocene | X(N) in N from C7 | X(N) in NN from C7 | X(N) in NNN from C7 | X(N) in NNN from C1/C4 | Σ X(N) from C7 | Σ X(N) from total NMR |
|---|---|---|---|---|---|---|---|
| 4 | 1 | 0.285 | 0.203 | 0.039 | 0.041 | 0.527 | 0.522 |
| 10 | 2 | 0.286 | 0.216 | 0.037 | 0.028 | 0.539 | 0.534 |
| 14 | 3 | 0.242 | 0.266 | 0.009 | 0.010 | 0.517 | 0.515 |
| 22 | 4 | 0.234 | 0.280 | — | — | 0.514 | 0.518 |
| 26 | 5 | 0.249 | 0.250 | 0.034 | 0.036 | 0.533 | 0.521 |
| 32 | 6 | 0.272 | 0.229 | 0.024 | 0.028 | 0.525 | 0.526 |
| 38 | 7 | 0.233 | 0.247 | 0.050 | 0.055 | 0.530 | 0.528 |
| 44 | V1 | 0.269 | 0.264 | — | — | 0.533 | 0.536 |
| 48 | V2 | 0.238 | 0.298 | — | — | 0.536 | 0.532 |

While the invention has been described in connection with numerous examples, modifications to those examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A process for the preparation of cycloolefin copolymers by polymerization of a) at least one cycloolefin of the general formula (I)

in which n is 0 or 1, m is 0 or a positive integer, $R^1, R^2, R^3, R^4, R^5, R^6$ independently of one another, are selected from the group consisting of hydrogen, halogen, cyclic and acyclic branched and straight-chain aliphatic hydrocarbon groups, aromatic hydrocarbon groups and alkoxy groups, $R^7, R^8, R^9, R^{10}, R^{11}, R^{12}, R^{13}, R^{14}, R^{15}, R^{16}$, independently of one another, are selected from the group consisting of hydrogen and aliphatic hydrocarbon groups, $R^{17}, R^{18}, R^{19}, R^{20}$, independently of one another, are selected from the group consisting of hydrogen, halogens and aliphatic hydrocarbon groups, it also being possible for $R^{17}$ and $R^{19}$ to be bonded to one another in such a way that they form a single ring or a ring system comprising a plurality of rings, it being possible for the ring or the rings to be saturated or unsaturated, with b) at least one 1-olefin of the formula (II)

(II)

in which $R^{21}$ and $R^{22}$, independently of one another, are selected from the group consisting of hydrogen and $C_{1-20}$-alkyl groups, for the preparation of cycloolefin copolymers, the cycloolefin and the comonomer being polymerized in the presence of a catalyst system which contains metallocene compounds of the general formula (IV)

(IV)

in which M is a metal of group IIIb, IVb, Vb and VIb of the Periodic Table of the Elements, $R^{313}$ and $R^{313a}$, independently of one another, are selected from the group consisting of hydrogen, $C_{1-4}$-alkyl groups, and aryl, $R^{311}$ is selected from the group consisting of isopropanyl and phenyl, and $R^{312}$ is selected from the group consisting of hydrogen and $C_1$-$C_4$-alkyl, and the radicals $R^{311}, R^{312}, R^{313}$ and $R^{313a}$ being selected so that the metallocene compound has no $C_s$ symmetry in relation to the centroid-M-centroid plane and wherein the metallocene is utilized in solution.

2. The process as claimed in claim 1, wherein M is selected from the group consisting of metals of group IV of the Periodic Table of Elements.

3. The process as claimed in claim 2, wherein M is zirconium.

4. The process as claimed in claim 1, wherein $R^{313}$ and $R^{313a}$, independently of one another, are selected from the group consisting of hydrogen, methyl and phenyl, at least one of the radicals $R^{313}$ or $R^{313a}$ not being hydrogen, and $R^{312}$ is selected from the group consisting of hydrogen and methyl.

5. The process as claimed in claim 4, wherein the catalyst is selected from the group consisting of:

6. The process as claimed in claim 1, wherein one or more aluminoxanes of the formula Va and/or Vb (VIa)

(VIb)

where, in the formulae Va and Vb, the radicals R are identical or different and are a $C_1$-$C_5$-alkyl group, a $C_6$-$C_{18}$-aryl group, benzyl or hydrogen and p is an integer from 2 to 50, preferably from 10 to 35 are used as the cocatalyst.

7. The process as claimed in claim 1, wherein ethene and norbornene are used as comonomers.

8. The process as claimed in claim 1, wherein a salt-like compound of the formula $R^{3'}_xNH_{4-x}BR^{4'}_4$ or the formula $R^{3'}_3PHBR^{4'}_4$, in which x=1, 2 or 3, $R^{3'}$=alkyl or aryl, identical or different, and $R^{4'}$=aryl, which may be fluorinated or partly fluorinated, is used as the cocatalyst.

9. A process for the preparation of cycloolefin copolymers by polymerization of a) at least on cycloolefin of the general formula (I)

(I)

in which n is 0 or 1, m is 0 or a positive integer, $R^1$, $R^2$, $R^3$, $R^4$, $R^5$, $R^6$ independently of one another, are selected from the group consisting of hydrogen, halogen, cyclic and acyclic branched and straight-chain aliphatic hydrocarbon groups, aromatic hydrocarbon groups and alkoxy groups, $R^7$, $R^8$, $R^9$, $R^{10}$, $R^{11}$, $R^{12}$, $R^{13}$, $R^{14}$, $R^{15}$, $R^{16}$, independently of one another, are selected from the group consisting of hydrogen and aliphatic hydrocarbon groups, $R^{17}$, $R^{18}$, $R^{19}$, $R^{20}$, independently of one another, are selected from the group consisting of hydrogen, halogens and aliphatic hydrocarbon groups, it also being possible for $R^{17}$ and $R^{19}$ to be bonded to one another in such a way that they form a single ring or a ring system comprising a plurality of rings, it being possible for the ring or the rings to be saturated or unsaturated, with b) at least one 1-olefin of the formula (II)

(II)

in which $R^{21}$ and $R^{22}$, independently of one another, are selected from the group consisting of hydrogen and $C_{1-20}$alkyl groups, the cycloolefin and the comonomer being polymerized in the presence of a catalyst system which contains a metallocene compound selected from the group consisting of wherein the cycloolefin copolymer contains racemic diads of repeating polycyclic units, which produce signals of about 29.44 ppm and about 31.24 ppm in a $^{13}$C-NMR spectrum, and additionally contains racemic triads of repeating polycyclic units, which produce signals from about 34.5 to 40.5 ppm in the $^{13}$C-NMR spectrum.

10. The process according to claim 9, wherein the metallocene compound is selected from the group consisting of:

11. A metallocene compound of the formula (IV)

(IV)

in which M is a metal of group IIIb, IVb, Vb and VIb of the Periodic Table of the Elements, $R^{313}$ and $R^{313a}$, independently of one another, are selected from the group consisting of hydrogen, $C_1$-$C_4$-alkyl and aryl, $R^{311}$ is phenyl, and $R^{312}$ is selected from the group consisting of hydrogen and $C_1$-$C_4$-alkyl.

12. A cycloolefin copolymer prepared by non-ring-opening polymerization of:

a) at least one cycloolefin of the general formula (I)

(I)

in which n is 0 or 1, m is 0 or a positive integer, $R^1$, $R^2$, $R^3$, $R^4$, $R^5$, $R^6$ independently of one another, are selected from the group consisting of hydrogen, halogen, cyclic and acyclic branched and straight-chain aliphatic hydrocarbon groups, aromatic hydrocarbon groups and alkoxy groups, $R^7$, $R^8$, $R^9$, $R^{10}$, $R^{11}$, $R^{12}$, $R^{13}$, $R^{14}$, $R^{15}$, $R^{16}$, independently of one another, are selected from the group consisting of hydrogen and aliphatic hydrocarbon groups, $R^{17}$, $R^{18}$, $R^{19}$, $R^{20}$, independently of one another, are selected from the group consisting of hydrogen, halogens and aliphatic hydrocarbon groups, it also being possible for $R^{17}$ and $R^{19}$ to be bonded to one another in such a way that they form a single ring or a ring system comprising a plurality of rings, it being possible for the ring or the rings to be saturated or unsaturated, with b) at least one 1-olefin of the formula (II)

(II)

in which $R^{21}$ and $R^{22}$, independently of one another, are selected from the group consisting of hydrogen and $C_{1-20}$-alkyl groups, wherein the cycloolefin copolymer contains racemic diads of repeating polycyclic units and additionally racemic triads of repeating polycyclic units, wherein the cycloolefin copolymer has signals from 34.5 to 40.5 ppm in its $^{13}$C-NMR spectrum; and wherein further the cycloolefin and the comonomer are polymerized in the presence of a catalyst system which contains metallocene compounds of the general formula (IV)

(IV)

in which M is a metal of group IIb, IVb, Vb and VIb of the Periodic Table of the Elements, $R^{313}$ and $R^{313a}$, independently of one another, are selected from the group consisting of hydrogen, $C_1$-$C_2$-alkyl and aryl, $R^{311}$ is selected from the group consisting of isopropanyl and phenyl, and $R^{312}$ is selected from the group consisting of hydrogen and $C_1$-$C_4$-alkyl, and the radicals $R^{311}$, $R^{312}$, $R^{313}$ and $R^{313a}$ being selected so that the metallocene compound has no $C_s$ symmetry in relation to the centroid-M-centroid plane.

13. The cycloolefin copolymer as claimed in claim 12, prepared by the polymerization of the at least on cycloolefin of the general formula with (I) the at least one 1-olefin of the formula (II), the cycloolefin and the comonomer being polymerized in the presence of a catalyst system which contains a metallocene compound that has no $C_s$ symmetry in relation to the centrold-M-centroid plane, wherein the metallocene compound is selected from the group consisting of:

14. The cycloolefin copolymer as claimed in claim 12, wherein said copolymer is derived from norbornene and ethylene and optionally further monomers copolymerizable therewith.

15. A process for the production of moldings, comprising
a) providing a cycloolefin copolymer of
  i) at least one cycloolefin of the general formula (I)

(I)

in which n is 0 or 1, m is 0 or a positive integer, $R^1$, $R^2$, $R^3$, $R^4$, $R^5$, $R^6$ independently of one another, are selected from the group consisting of hydrogen, halogen, cyclic and acyclic branched and straight-chain aliphatic hydrocarbon groups, aromatic hydrocarbon groups and alkoxy groups, $R^7$, $R^8$, $R^9$, $R^{10}$, $R^{11}$, $R^{12}$, $R^{13}$, $R^{14}$, $R^{15}$, $R^{16}$, independently of one another, are selected from the group consisting of hydrogen and aliphatic hydrocarbon groups, $R^{17}$, $R^{18}$, $R^{19}$, $R^{20}$, independently of one another, are selected from the group consisting of hydrogen, halogens and aliphatic hydrocarbon groups, it also being possible for $R^{17}$ and $R^{19}$ to be bonded to one another in such a way that they form a single ring or a ring system comprising a plurality of rings, it being possible for the ring or the rings to be saturated or unsaturated, with ii) at least one 1-olefin of the formula (II)

(II)

in which $R^{21}$ and $R^{22}$, independently of one another, are selected from the group consisting of hydrogen and $C_{1-20}$-alkyl groups, wherein the cycloolefin copolymer contain racemic diads of repeating polycyclic units and additionally racemic triads of repeating polycyclic units, and wherein the cycloolefin copolymer has signals from 34.5 to 40.5 ppm in its $^{13}$C-NMR spectrum; and b) forming a molding from the cycloolefin copolymer;

wherein the cycloolefin and the comonomer are prepared by polymerization in the presence of a catalyst system which contains metallocene compounds of the general formula (IV)

(IV)

in which M is a metal of group IIb, IVb, Vb and VIb of the Periodic Table of the Elements, $R^{313}$ and $R^{313a}$, independently of one another, are selected from the group consisting of hydrogen and $C_1$-$C_4$-alkyl, and aryl, $R^{311}$ is selected from the group consisting of isopropanyl and phenyl, and $R^{312}$ is selected from the group consisting of hydrogen and $C_1$-$C_4$-alkyl, and the radicals $R^{311}$, $R^{312}$, $R^{313}$ and $R^{313a}$ being selected so that the metallocene compound has no $C_s$ symmetry in relation to the centroid-M-centroid plane.

16. The process for production of moldings as claimed in claim 15, wherein the moldings are films, transparent containers or transparent components.

* * * * *